(12) United States Patent
Yasuda

(10) Patent No.: US 6,588,941 B2
(45) Date of Patent: Jul. 8, 2003

(54) CONNECTING MECHANISM, OPTICAL SIGNAL CABLE, AND OPTICAL COMMUNICATION CABLE PRODUCTION METHOD

(75) Inventor: Nobuyuki Yasuda, Chiba (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 09/944,319

(22) Filed: Aug. 31, 2001

(65) Prior Publication Data

US 2002/0028047 A1 Mar. 7, 2002

(30) Foreign Application Priority Data

Sep. 6, 2000 (JP) .......................... 2000-275004
Jul. 26, 2001 (JP) .......................... 2001-226429

(51) Int. Cl.$^7$ ................................. G02B 6/36
(52) U.S. Cl. ........................................ 385/79
(58) Field of Search .................. 385/79, 78, 81, 385/83, 84, 92

(56) References Cited

U.S. PATENT DOCUMENTS

| 4,191,447 A | | 3/1980 | Borsuk ..................... 385/78 |
| 4,695,124 A | * | 9/1987 | Himono et al. ............. 385/78 |
| 5,097,522 A | * | 3/1992 | Tackett et al. ............. 385/53 |
| 5,590,231 A | * | 12/1996 | Kawamura et al. ........... 385/78 |

FOREIGN PATENT DOCUMENTS

| DE | 3005918 | | 9/1981 | |
| JP | 62170915 | | 7/1987 | |
| JP | 08021929 | | 1/1996 | |
| JP | 08338930 | | 12/1996 | |
| JP | 10148731 | | 6/1998 | |
| JP | 2002-228882 | * | 8/2002 | ........... G02B/6/40 |

* cited by examiner

Primary Examiner—Tulsidas Patel
(74) Attorney, Agent, or Firm—Jay H. Maioli

(57) ABSTRACT

An optical fiber that transmits an optical signal is fixed to a plug, which connects to another apparatus, by causing an expanded part created by melting the tip of the optical fiber to flow into a fixing part provided in the plug. The expanded part is then solidified.

18 Claims, 7 Drawing Sheets

CONNECTING MECHANISM, OPTICAL SIGNAL CABLE, AND OPTICAL COMMUNICATION CABLE PRODUCTION METHOD

BACKGROUND OF THE INVENTION

1. Field of the Invention

The present invention relates to a connecting mechanism, an optical signal cable, and an optical communication cable production method for fixing an optical fiber which transmits an optical signal and a plug for connecting the tip of the optical fiber to another apparatus.

2. Description of the Related Art

Conventionally, when connecting a plurality of electronic apparatuses, dedicated signal cables are used, and connectors are used for the connection between the signal cables and the electronic apparatuses. For example, normally, by inserting a plug or jack that is fitted to the end of the signal cable into a jack or plug provided in the electronic apparatus, it is possible to establish a connection between the signal cable and the electronic apparatus.

Recently, for the signal cables which are being used for connecting individual electronic apparatus, not only are conventionally known electrical signal cables used, but also, for example, optical signal cables which use light to perform information transmission are used.

Silica glass, compound glass, or plastic is used to produce the optical fibers used in the optical signal cables. In particular, special connectors are generally used when plastic optical fibers are connected together, or to connect light emitting parts, light receiving parts, etc. of components and apparatuses.

As shown in FIG. 8, a connector which forms a connection mechanism of an optical cable 10 which is capable of transmitting optical signals is constructed of a plug 2 and a jack 12. The plug 2 is fitted to an end of the optical cable 10, whereas the jack 12 is installed in, for example, the back of an electronic apparatus. With such a connector, by fitting the plug 2 into the jack 12, optical signals are transmitted and received inside the jack 12 between the tip of the core of the optical cable 10 which reaches the vicinity of the end of the plug 2 and a light emitting/receiving part (not shown in this figure) in the electronic apparatus 11.

When optically connecting light emitting/receiving elements etc. with the optical fiber, the plug 2 used as a connector has a hollow section and the optical fiber is inserted into this hollow section and the tip of the optical fiber is fixed. Thus the plug 2 forms a highly reliable connection. A metal such as aluminum, stainless steel, brass, or engineering plastic is used as the material. In particular, since the end face is pressed against a heating plate to fix the optical fiber, a heat resistant material is preferable.

Conventionally, for fixing the plug and the tip of the optical fiber, the optical fiber cover part is clamped by the connector, a ferrule part at the end of the connector and the optical fiber are bonded by filling an adhesive therebetween, or teeth-like hooks are formed inside the plug and the inserted optical fiber is caught thereby; and then, after fixing, processing is performed on the tip of the optical fiber which protrudes from the end of the plug.

FIG. 1 is a partial sectional view showing the connection state between an optical fiber, in particular, the optical signal cable 10 which is formed of an optical fiber, and a light receiving part of an electronic apparatus. An optical fiber 1 has a portion of a cover 6 cut off at the tip to expose the core and is inserted into a penetrating hole of the plug 2. The end part of the optical fiber cover 6 abuts against a step portion formed at the boundary between a small diameter section and a large diameter section of the penetrating hole of the plug 2, and a clamping part 7 is formed at a certain portion of the cover 6, thus fixing the plug 2 and the optical fiber 1.

Light emitted by an LED or a laser and transmitted along the inside of the optical fiber 1 emerges from the tip of the optical fiber 1, is focussed by a lens 13a of a light receiving device 13 in the electronic apparatus, and is received as an optical signal at a light receiving part 13b. It is not always necessary to provide the lens 13 in the light receiving device 13.

In fixing the tip of the core of the optical fiber 1 and the ferrule part of the plug 2, as described above, the clamping part 7 is formed at the portion where the cover 6 of the optical fiber and the plug 2 overlap, or they are bonded. However, when the cable 10 is bent and straightened, in a phenomenon referred to as pistoning, wherein the core of the optical fiber is pushed out and pulled in from the ferrule part at the end of the plug 2, the core moves in and out over a 1-mm region, as indicated by d in FIG. 1. This may cause the light receiving part 13 of the electronic apparatus to break or may cause the level of transmitted light to be greatly reduced. Moreover, when adhesive is used, the optical characteristics may be adversely influenced in some cases.

As shown in FIGS. 2A and 2B, as a measure to prevent pistoning, the tip of the core of the optical fiber 1 is formed into the shape of a mushroom, thus forming a convex part. The optical fiber 1 has a portion of the cover cut off at the tip to expose the core and is inserted into the penetrating hole of the plug 2. The length of the portion of the optical fiber 1 from which the cover has been removed is arranged to be just barely larger than the length of the small diameter section of the penetrating hole in the plug 2 shown in FIG. 1. Accordingly, when the end of the cover of the optical fiber abuts against the step portion formed at the boundary between the small diameter section and the large diameter section of the penetrating hole in the plug 2, the tip of the optical fiber 1 partially protrudes.

Here, if the core which is pushed out from the end of the plug 2 is pressed against a concave surface section of a heating apparatus 5 used for molding, the surface of the heated optical fiber 1 melts, a convex part is formed at the tip of the optical fiber 1 by the concave surface section of the heating apparatus 5, the mushroom shape covers the end of the plug, and the fiber 1 becomes fixed. If molding is performed in this fashion, since a portion of the hat of the mushroom-shape at the tip and the end of the plug 2 are in contact, the core cannot easily retract. However, it is difficult to prevent it from being pushed out, and furthermore, since the end portion of the mushroom shape at the tip of the optical fiber 1, from which the optical signal transmitted along the inside of the optical fiber 1 is emitted, is exposed, it can easily be damaged.

Furthermore, by molding the tip of the optical fiber into the mushroom shape thus forming a dome shape, when the shape of the tip is a curved surface, it is difficult for the emerging light to return. As a result, the accuracy of bi-directional communication is also improved.

Accordingly, in conventional methods for fixing the tip of an optical fiber core and plug, since the optical characteristics are degraded by directly clamping the core of the optical fiber, the plug 2 clamps the cover 6 which protects the optical fiber from above, and the fixing is indirectly performed by, for example, forming the clamping part 7 or pressing a clip. However, due to optical limitations, since it is not possible to securely fix the optical fiber and the cable cover portion, in fixing the cover of the cable with the plug from above, the core of the optical fiber is caused to move slightly in the axial direction by bending and pulling of the cable and the connection positional accuracy of the connector is thus reduced.

In order to prevent this, there are methods for directly bonding the plug and the optical fiber by an adhesive. However, this results in increased production costs and, furthermore, there is a significant adverse influence on the optical characteristics. Accordingly, in fixing optical fibers and plugs by conventional means, the in-and-out movement of the core cannot be completely prevented, and there is a problem in that the cable is not ideally suited for use in recent electronic devices which transmit and receive signals at high speed.

SUMMARY OF THE INVENTION

It is an object of the present invention to provide a connecting mechanism for transmitting an optical signal between another apparatus and an optical fiber while retaining the optical fiber which transmits the optical signal. The connecting mechanism includes an insertion part through which the optical fiber is inserted. The insertion part has a tapered portion at at least one internal diameter section close to an end thereof. The connecting mechanism also includes a fixing groove, provided in the tapered portion of the insertion part, which fixes the optical fiber to the connecting mechanism by causing an expanded part, which is created as a result of melting a tip of the optical fiber that is inserted in the insertion part, to flow into the fixing groove and solidify.

Another object of the present invention is to provide an optical signal cable which transmits an optical signal and which emits and/or receives the optical signal to/from another apparatus. The optical signal cable includes an optical fiber which transmits the optical signal, and a connecting part which attachably and removably connects to the other apparatus while retaining the optical fiber. The connecting part has an insertion part for inserting the optical fiber through the inner diameter thereof; a tapered portion which is formed to taper outwardly at the inner circumference of at least one end of the insertion part; and at least one fixing groove formed in part of the tapered portion and into which an expanded part, which is created by melting a tip of the optical fiber, flows and solidifies.

Another object of the present invention is to provide an optical communication cable production method, wherein a thermomolding apparatus is used to fix an optical fiber to a connecting mechanism which retains the optical fiber, the connecting mechanism being provided with a fixing part for fixing the optical fiber to part of a tapered portion which is formed by outwardly tapering the inside part of one end of a penetrating hole which is provided inside the connecting mechanism to allow the optical fiber, which transmits an optical signal, to be inserted therethrough. The method comprises a step of inserting the optical fiber into the penetrating hole in the connecting mechanism; a step of heating a tip of the inserted optical fiber with the thermomolding apparatus; and a step of stopping the heating by the thermomolding apparatus when an expanded part, which is created by melting the tip of the optical fiber as a result of heating the tip of the optical fiber with the thermomolding apparatus, has flowed into the fixing part.

BRIEF DESCRIPTION OF THE DRAWINGS

FIGS. 4A to 4D show a method for fixing a plastic optical fiber of the optical signal cable of the present invention to a plug, wherein FIG. 4A shows a sectional view of the end portion before molding, FIG. 4B shows a sectional view of the end portion after molding, and FIGS. 4C and 4D show partially enlarged views of different ways in which the plastic optical fiber is fixed to a tapered portion;

DESCRIPTION OF THE PREFERRED EMBODIMENTS

Figure 1:
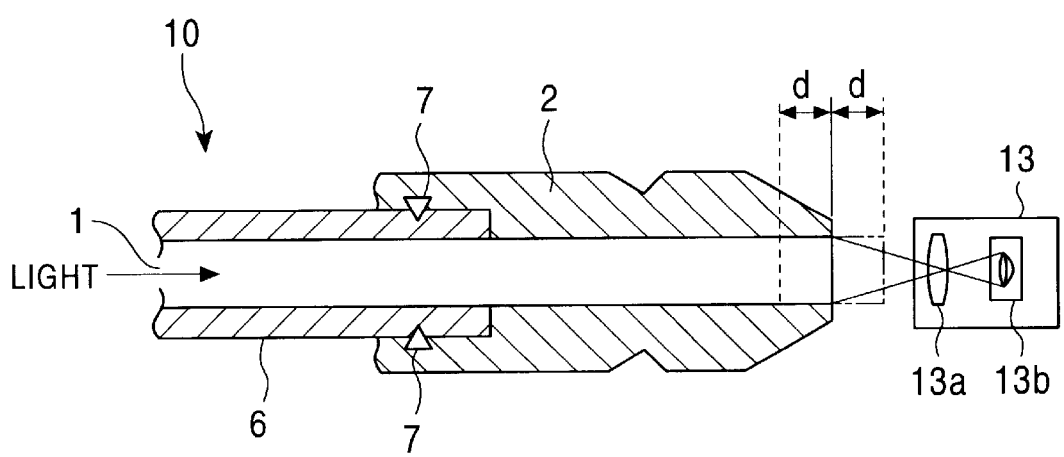
FIG. 1 is a sectional view showing a method for fixing a plastic optical fiber of a conventional optical signal cable to a plug.
Figure 3A:
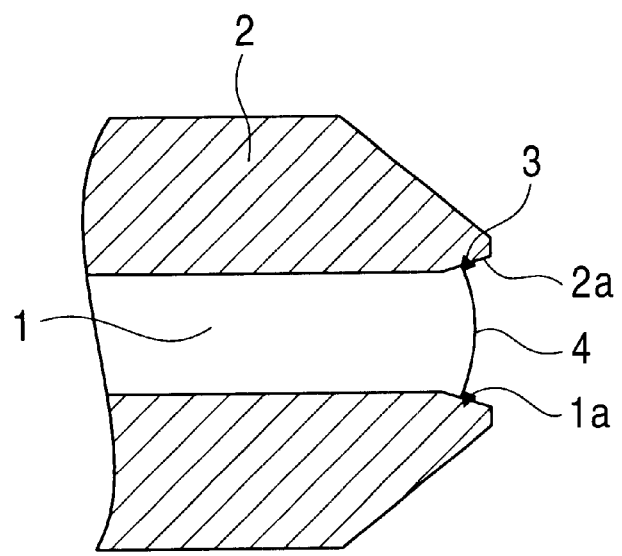
FIGS. 3A and 3B are a sectional view and an end view, respectively, of the end portion of an optical signal cable of a first embodiment of the present invention.
Figure 3B:
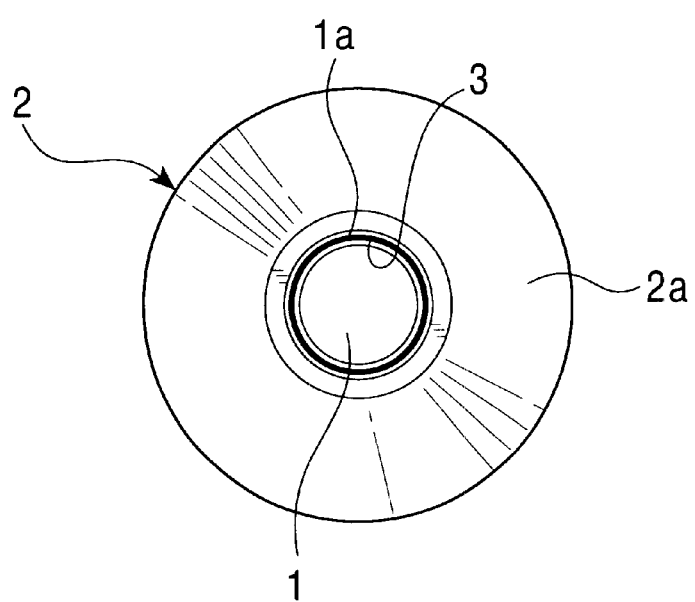
Figure 8:
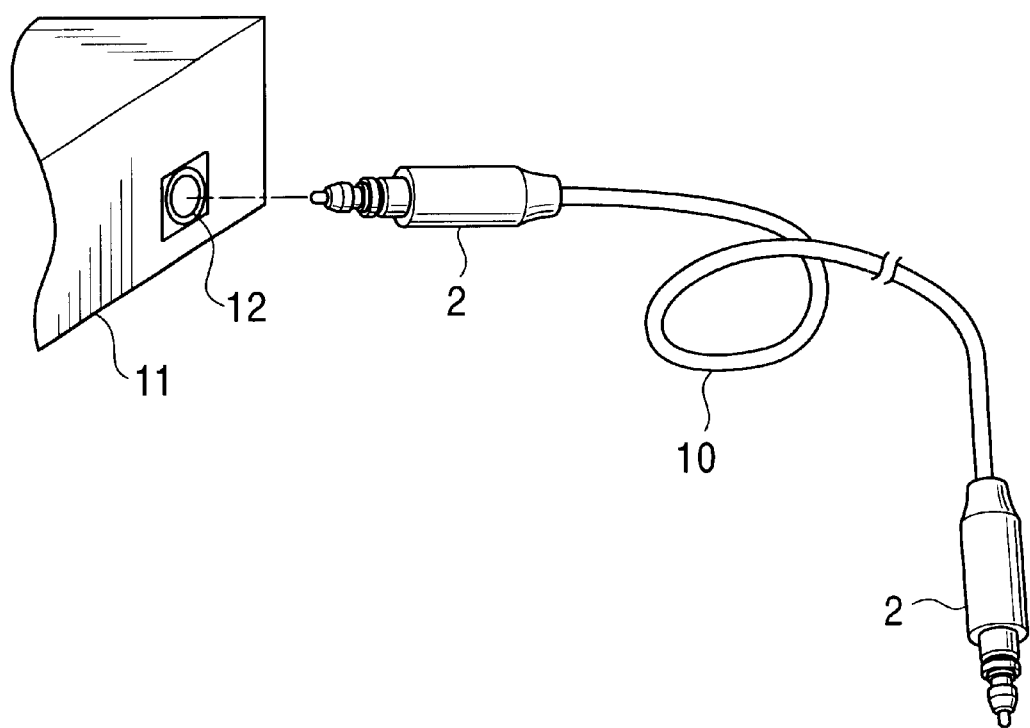
FIG. 8 is a conceptual diagram showing an example of the connection between the optical signal cable and an electronic apparatus.

FIGS. 3A and 3B show a first embodiment of the present invention which is applied, in particular, to a plastic optical fiber, wherein FIG. 1A shows only the cross-sectional configuration of a tip portion of a plastic optical fiber cable, and FIG. 1B shows a front view of a plug 2. The configuration of parts of the optical signal cable which are not shown in the figures is the same as that shown in FIGS. 1 and 8 described above in "Description of the Related Art".

A tapered portion 2a which slopes outwardly is provided in the inner diameter section of the tip of the plug 2 and a ring-shaped plastic optical fiber fixing groove 3 is provided around the circumference thereof at a predetermined position. A molding fin 1a of a plastic optical fiber 1 formed as a result of melting by a plastic optical fiber tip thermomolding apparatus 5 shown in FIG. 4A flows into the ring-shaped plastic optical fiber fixing groove 3 to form a solidified fixing part.

Figure 4A:
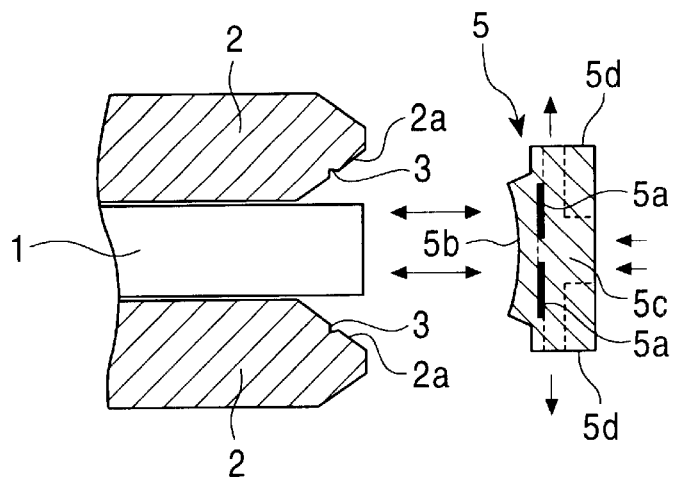
Figure 4B:
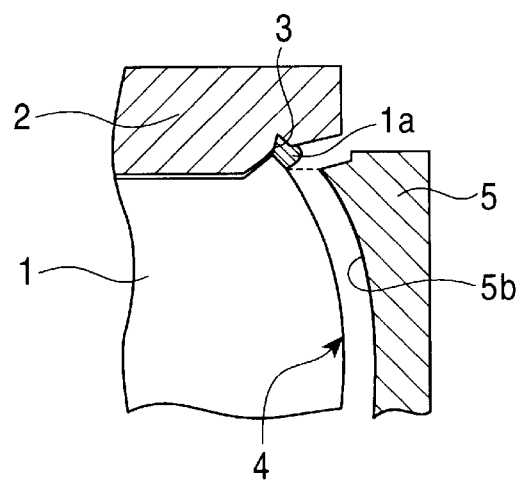
Figure 4C:
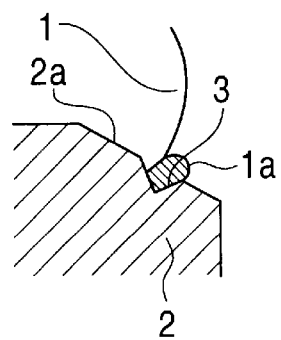
Figure 4D:
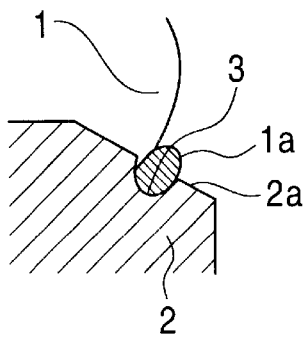

FIGS. 4A, 4B, 4C, and 4D are sectional views showing a method according to the present invention for fixing the plastic optical fiber cable to the plug 2 using the plastic optical fiber tip thermomolding apparatus 5, wherein FIG. 4A shows the tip portion of the plastic optical fiber 1 before molding, FIG. 4B shows a cross-section of the tip portion after molding, and FIGS. 4C and 4D show an enlarged view of part of the plastic optical fiber fixing groove 3.

The tapered portion 2a is provided in the inner diameter part near the end of the plug 2, and the plastic optical fiber fixing groove 3 for fixing the plastic optical fiber 1 is provided around the circumference of the tapered portion 2a at a predetermined position.

As shown in FIGS. 4C and 4D, the shape of the plastic optical fiber fixing groove 3 may be either an angular depression or a circular depression. The size, in terms of the volume, of the groove constituting the depression-shaped fixing groove 3, and the position of the tapered portion 2 are set according to the material, the diameter, etc., of the plastic optical fiber 1. More concretely, they are suitable set such that the molding fin 1a, which is formed by melting and expansion of the plastic optical fiber during thermomolding, flows and then hardens to act as a wedge which can prevent the optical fiber 1 from moving in the axial direction.

The plastic optical fiber tip thermomolding apparatus 5 is formed of a heater 5a, a concave molding surface 5b, and cooling passages 5c and 5d through which a gas or liquid cooling medium can flow. The heating temperature of the heater 5a is set such that it is controlled to a suitable temperature according to the material of the plastic optical fiber 1. The shape, dimensions, and operation of the plastic optical fiber tip thermomolding apparatus 5 are suitably determined so that the molding fin 1a of the plastic optical fiber 1 quickly flows into the fixing groove 3.

First of all, as shown in FIG. 4A, the plastic optical fiber 1 is inserted into a penetrating hole in the plug 2 and is cut so that a predetermined length from the fixing groove 3 in the tapered portion 2a of the plug 2 remains. A clamping part 7 like that for the plastic optical fiber 1 shown in FIG. 1 may be formed at this time, or alternatively, clamping may be done after molding the tip.

Next, as shown in FIG. 4B, after the heater 5a of the plastic optical fiber tip thermomolding apparatus 5 is supplied with power and heated, the concave molding surface 5b of the thermomolding apparatus 5 is pressed against the tip portion of the plastic optical fiber 1 which has been cut, the fiber 1 continues to expand to fit the shape of the tapered portion 2a while being melted, the molding fin 1a which is squeezed out from the concave molding surface 5b of the heating apparatus 5 enters the plastic optical fiber fixing groove 3, and, while the plastic optical fiber 1 and the plug 2 are being fixed, at the same time, the tip of the plastic optical fiber is formed into a convex shape, thus completing the formation of a spherical tip 4.

After molding the plastic optical fiber 1, the power supplied to the heater 5a is stopped, the gas or liquid cooling medium flows through the cooling passages 5c and 5d thus cooling the thermomolding apparatus 5 by air cooling or water cooling, and the thermomolding apparatus 5 is removed when the plastic optical fiber tip 4 reaches its solidifying temperature, thereby fixing the plastic optical fiber 1 and the plug 2.

Moreover, using a heater is not the only method of melting the tip of the optical fiber for shaping the optical fiber. It is also possible to melt the tip of the optical fiber by high frequency vibrations when such high frequency vibrations are applied to the molding surface 5b on the concave surface of the optical fiber tip thermomolding apparatus.

Figure 5A:
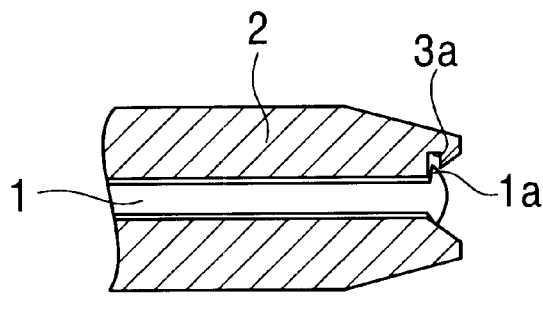
FIGS. 5A and 5B are a sectional view and an end view, respectively, showing a second embodiment of the present invention.
Figure 5B:
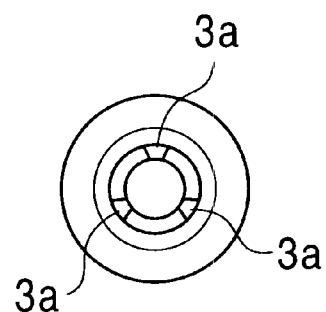

FIGS. 5A and 5B show a second embodiment of the present invention. Unlike the first embodiment, plastic optical fiber fixing grooves 3a are not cut around the complete circumference, but are separated into a plurality of grooves, and the tip of the plastic optical fiber 1 and the plug 2 are fixed by the plurality of fixing grooves 3a. By providing such a structure, when performing molding of the plastic optical fiber tip, the amount of the plastic optical fiber tip which is melted and expanded can be reduced, thus allowing the molding time to be shortened and costs to be reduced.

Figure 6:
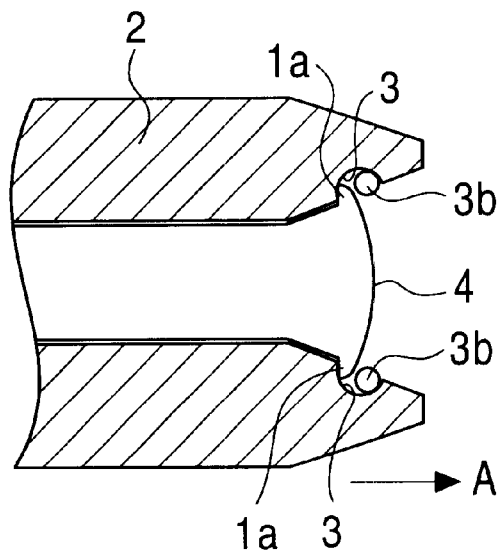
FIG. 6 is a sectional view showing a third embodiment of the present invention.

FIG. 6 shows a third embodiment of the present invention. The fixing groove 3 is formed to have a width and depth larger than those of the first embodiment so that the groove is not completely filled by the molding fin 1a. Then, an elastic ring 3b is inserted from the end of the plug 2 to securely prevent the tip of the plastic optical fiber 1 from being pulled out in the direction indicated by the arrow A, and even though the amount of the plastic optical fiber tip which is melted and expanded is reduced, the plastic optical fiber 1 and the plug 2 can be securely fixed.

Figure 2A:
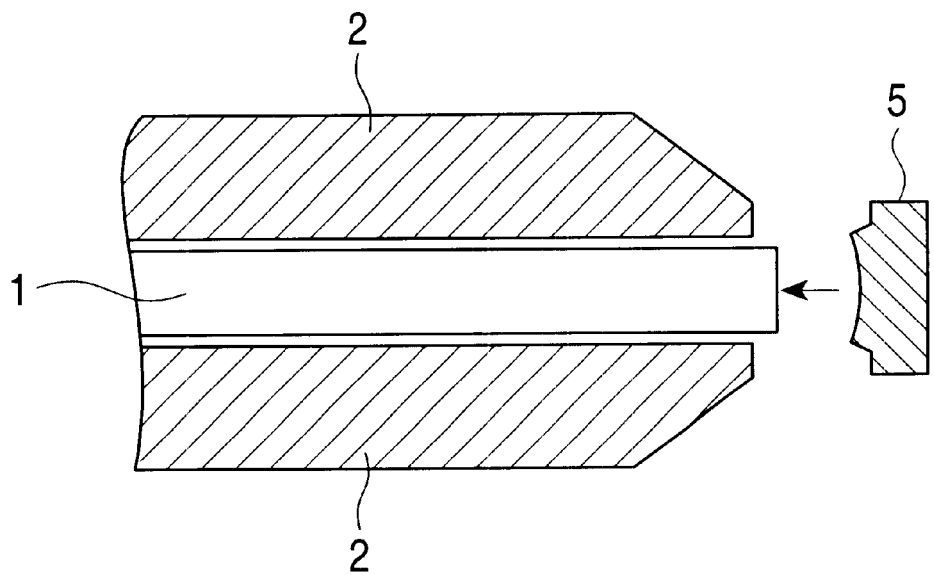
FIGS. 2A and 2B are sectional views showing another method for fixing a plastic optical fiber of a conventional optical signal cable to a plug.
Figure 2B:
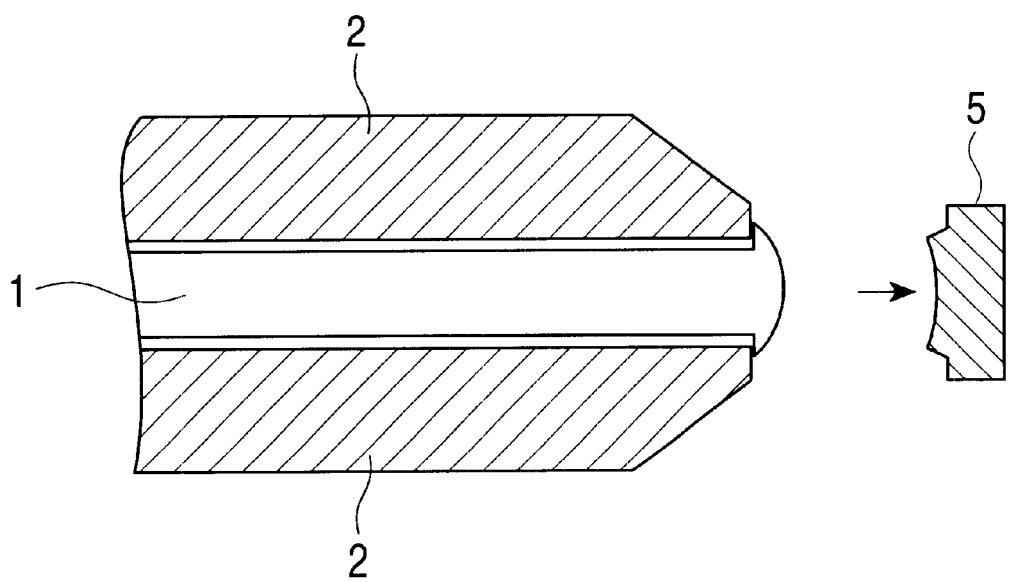
Figure 7A:
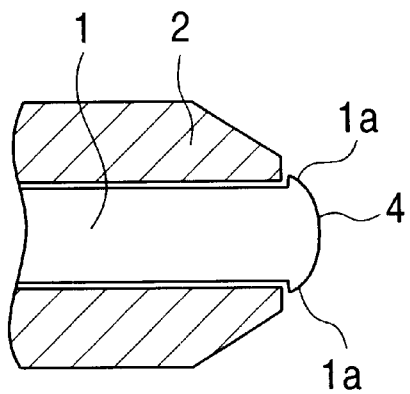
FIGS. 7A to 7D show a fourth embodiment of the present invention.
Figure 7B:
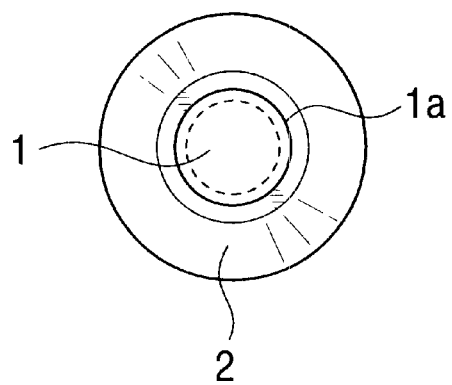
Figure 7C:
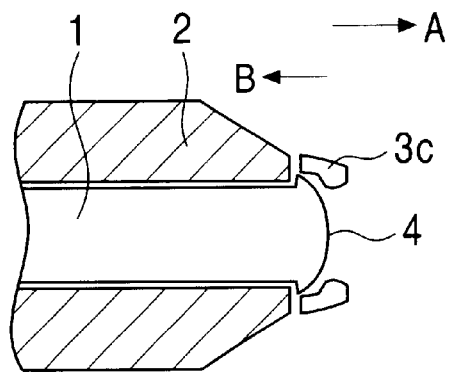
Figure 7D:
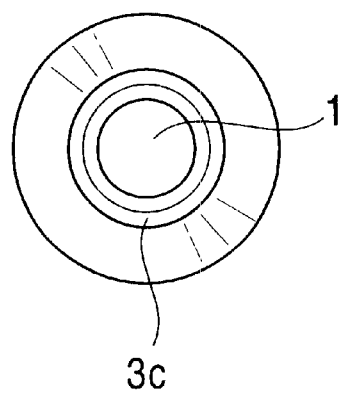

FIGS. 7A, 7B, 7C, and 7D show a fourth embodiment of the present invention which is an improvement over the conventional connection terminal shown in FIGS. 2A and 2B. In a first step which is shown in FIGS. 7A and 7B, a mushroom-shaped tip 4 is formed in the plastic optical fiber 1 by the thermomolding apparatus 5, and the plug 2 and a circumferential portion (molding fin) 1a of the mushroom-shaped tip 4 are made to overlap. In a second step shown in FIGS. 7C and 7D, a cap 3c covers the front of the plug 2, the plug 2 and the mushroom-shaped circumferential portion (molding fin) 1a at the tip 4 of the plastic optical fiber 1 are fixed, thus protecting the tip 4 of the plastic optical fiber 1 and preventing motion of the fiber 1 in the directions indicated by arrows A and B. In this aspect of the embodiment, the molding fin 1a of the plastic optical fiber 1 corresponds to the portion of the hat around the circumference of the mushroom-shape at the tip 4 of the plastic optical fiber 1, and the end of the plug 2 and the cap 3 become fixed at a groove portion formed therebetween.

To fix the cap 3c and the end of the plug 2, a fixing method using an adhesive applied to both components, fixing methods such as a method in which a convex part and a concave part are respectively formed in both components and the components are fitted together, or a method in which the cap 3c and the mushroom-shaped circumferential portion 1a at the tip of the plastic optical fiber are clamped may be used.

According to the present invention, since the melted molding fin 1a of the plastic optical fiber 1 flows into and is fixed in the fixing groove 3 of the plug 2, the plug 2 and the plastic optical fiber 1 are securely fixed to each other, thus allowing pistoning to be prevented.

Moreover, since fixing of the plastic optical fiber 1 and the plug 2 can be done at the same time as molding of the optical fiber tip, the production process is suitable for mass production while also allowing costs to be reduced.

Since the tip portion of the plastic optical fiber is not fixed by an adhesive or clamping, and moreover, since the tip 4 or the plastic optical fiber is not exposed, the optical characteristics of the optical fiber are not degraded.

What is claimed is:

1. A connecting mechanism for retaining an optical fiber that transmits an optical signal, comprising:

insertion means through which said optical fiber is inserted, said insertion means having a tapered portion formed in at least one internal diameter section close to an end thereof; and fixing groove means provided in the tapered portion of said insertion means for fixing said optical fiber to said connecting mechanism by causing an expanded part created by melting a tip of said optical fiber that is inserted in said insertion means to flow into said fixing groove means and to subsequently solidify.

2. The connecting mechanism according to claim 1, wherein said fixing groove means is formed as a ring provided around a circumference of said tapered portion.

3. The connecting mechanism according to claim 1, wherein said fixing groove means is formed as a ring that is provided around a circumference of said tapered portion and is divided into a plurality of sections.

4. The connecting mechanism according to claim 1, wherein said tapered portion comprises a first tapered portion and further comprising a second tapered portion formed on an outer circumference section close to said first tapered portion of said insertion means.

5. The connecting mechanism according to claim 1, wherein the internal diameter close to the end at which said tapered portion of said insertion means is formed and an internal diameter close to an other end are different.

6. The connecting mechanism according to claim 5, wherein the internal diameter close to the end of said insertion means that is different from the end at which said tapered portion is formed is dimensioned to allow at least an unremoved portion of a cover of said optical fiber to be inserted therethrough.

7. An optical signal cable for transmitting an optical signal and for emitting and/or receiving said optical signal to/from another apparatus, said cable comprising:
  an optical fiber for transmitting said optical signal; and
  connecting means for attachably and removably connecting to said other apparatus while retaining said optical fiber, said connecting means having:
    an insertion part for having said optical fiber inserted through an inner diameter thereof;
    a tapered portion formed to taper outwardly at an inner circumference of at least one end of said insertion part; and
    at least one fixing groove formed in part of said tapered portion and into which an expanded part, which is created by melting a tip of said optical fiber, flows and solidifies.

8. The optical signal cable according to claim 7, wherein said fixing groove of said connecting means is formed as a ring provided around a circumference of said tapered portion of said connecting means.

9. The optical signal cable according to claim 7, wherein said fixing groove of said connecting means is formed as a ring provided around a circumference of said tapered portion of said connecting means and is divided into a plurality of sections.

10. The optical signal cable according to claim 7, wherein the tip of said optical fiber retained in said connecting means forms a curved surface caused by said melting.

11. The optical signal cable according to claim 7, wherein said connecting means further comprises auxiliary fixing means for fixing the expanded part of said optical fiber solidified in the fixing groove of said connecting means.

12. The optical signal cable according to claim 11, wherein:
  said fixing groove is formed around a circumference of said tapered portion; and
  said auxiliary fixing means comprises an elastic ring inserted in a gap between the ring-shaped fixing groove and the expanded part having flowed into said fixing groove and solidified.

13. The optical signal cable according to claim 7, wherein said optical fiber comprises a plastic optical fiber.

14. The optical signal cable according to claim 7, wherein a temperature at which said optical fiber melts is lower than a temperature at which said connecting means melts.

15. An optical communication cable production method, wherein a thermomolding apparatus is used to fix an optical fiber to a connecting mechanism which retains said optical fiber, said connecting mechanism being provided with a fixing part for fixing said optical fiber to part of a tapered portion which is formed by outwardly tapering the inside part of one end of a penetrating hole which is provided inside said connecting mechanism to allow said optical fiber, which transmits an optical signal, to be inserted therethrough, said method comprising the steps of:
  inserting said optical fiber into said penetrating hole in said connecting mechanism;
  heating a tip of said inserted optical fiber with said thermomolding apparatus; and
  stopping the heating by said thermomolding apparatus when an expanded part, which is created by melting the tip of said optical fiber as a result of heating the tip of said optical fiber with said thermomolding apparatus, has flowed into said fixing part.

16. The optical communication cable production method according to claim 15, further comprising the step of cooling said thermomolding apparatus upon stopping the heating.

17. The optical communication cable production method according to claim 15, wherein the heating by said thermomolding apparatus is performed by causing said thermomolding apparatus to vibrate at high-frequency.

18. The optical communication cable production method according to claim 15, wherein a molding section of said thermomolding apparatus which contacts the tip of said optical fiber is a concave surface, and the melted and molded tip of said optical fiber is molded into a curved surface.

* * * * *